Jan. 13, 1959

A. HAHNEL 2,868,976

SPECTRUM GENERATOR

Filed Dec. 21, 1954

INVENTOR.
ALWIN HAHNEL

BY Harry M. Saragovitz
ATTORNEY

United States Patent Office 2,868,976

Patented Jan. 13, 1959

2,868,976

SPECTRUM GENERATOR

Alwin Hahnel, Little Silver, N. J., assignor to the United States of America as represented by the Secretary of the Army Application December 21, 1954, Serial No. 476,859

1 Claim. (Cl. 250—36)

(Granted under Title 35, U. S. Code (1952), sec. 266)

The invention described herein may be manufactured and used by or for the Government for governmental purposes, without the payment of any royalty thereon.

This invention relates to periodically controlled oscillators and more particularly to a spectrum generator having variable amplitude characteristics.

Frequency marker generators or spectrum generators known and used in the past have been expensive and complicated, usually requiring an excessive number of crystals for proper operation.

It is an object of this invention to provide a simple circuit for the generation of a frequency spectrum of high order harmonics which display a ruler-like amplitude distribution.

It is another object of this invention to provide a simple circuit for the generation of a frequency spectrum of high order harmonics which permits the change from a widely spaced output spectrum to one which has numerous interpolating frequencies equally spaced, which change is accomplished without the switching of any tuned circuits or the switching of any crystal controlled circuits.

The frequency marker generator described herein may be found useful in the frequency controlled portion of multi-channel equipment where it is desirable to utilize the minimum number of crystals or where miniaturization is important. Two other possible applications include wide range frequency meters and frequency controlled systems of various types.

The above and other objects and advantages will become apparent when the following specification is read in conjunction with the drawings in which.

Figure 1:
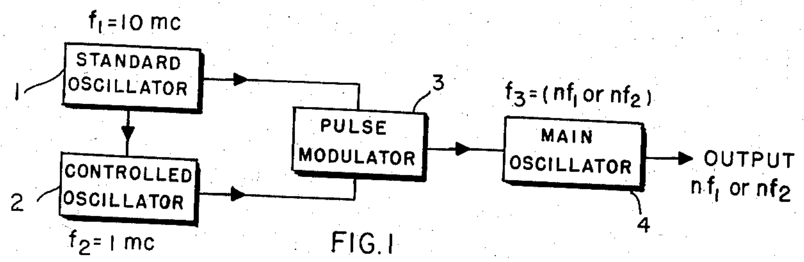
Figure 1 is a block diagram of the invention.

Referring to Figure 1, the circuit in general comprises a main oscillator 4, the frequency of which ($f_3$) may be varied within certain limits. The main oscillator 4 is periodically controlled by two pulse repetition frequencies ($f_1$) and ($f_2$) differing by a ratio of, for example, 10 to 1. This is accomplished by a standard oscillator 1 which may be crystal controlled, operating at a frequency ($f_1$), as for example, 10 mc. A portion of the output of standard oscillator 1 is utilized to control a second oscillator indicated by the reference numeral 2 to operate at a frequency ($f_2$), as for example, 1/10 of the frequency of the standard oscillator, or 1 mc. The outputs of both the standard oscillator 1 and the controlled oscillator 2 are fed into a pulse modulator 3. The output of the pulse modulator 3 is fed to the main oscillator 4 so that the main oscillator is periodically controlled at the pulse repetition frequencies $f_1$ and $f_2$. The frequency ratios of $f_1$ and $f_2$ may be as low as 2 to 1, and as far as the main oscillator 4 is concerned, the ratio may be larger than 100 to 1. The output wave form of the main oscillator 4 will be a spectrum of exact harmonics of $f_1$. Since $f_2$ is essentially selected to be a subharmonic of $f_1$, the output also contains harmonics of $f_2$.

Figure 2:
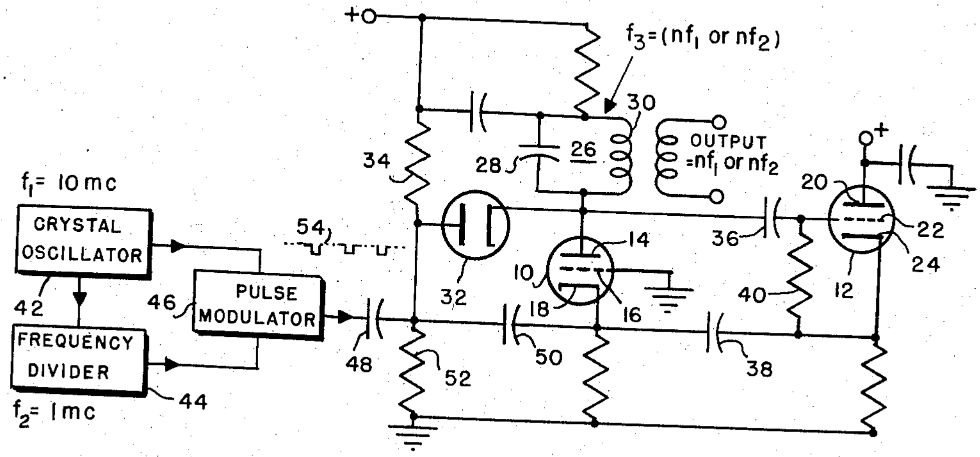
Figure 2 is a schematic diagram of a circuit embodying this invention.

A specific circuit for accomplishing the invention is illustrated in Figure 2. This circuit utilizes an oscillator having two electron tubes 10 and 12 respectively, the tube 10 including an anode 14, grid 16 and cathode 18. The second tube 12 also includes an anode 20, a grid 22 and a cathode 24. The anode 14 of the tube 10 is connected to the positive side of the high voltage supply through a resonant tank circuit 26. The tank circuit 26 includes a capacitor 28 and an inductance 30 connected in parallel. Another branch of the anode circuit 14 of oscillator tube 10 includes a diode rectifier 32 connected to the positive side of the high voltage supply through a dropping resistor 34. The output of oscillator tube 10 taken from the anode 14 is connected through a blocking condenser 36 to the grid 22 of tube 12. The output of tube 12 is taken from the cathode 24 through a blocking condenser 38 to the cathode 18 of tube 10. Bias for the grid 22 of tube 12 is obtained by means of the usual resistor 40.

The tank circuit 26 is tuned to the center of the desired range of the output spectrum. To quench the oscillations there is provided a crystal controlled oscillator 42 designed to operate at a frequency $f_1$ which, by way of example, may be 10 mc. A second source of oscillations is designated by the reference numeral 44, such as a frequency divider designed to operate at a frequency $f_2$, which by way of example may be 1 mc. The output of the signal sources 42 and 44 are fed to a pulse modulator 46, the output of which is connected through blocking condensers 48 and 50 to the cathode 18 of the oscillator tube 10. As indicated in Figure 2 the output of the pulse modulator 46 is a series of negative going pulses 54 whose periodicity is $1/f_2$.

As stated above, the pulses at the repetition frequency $f_1$ may be generated by any conventional crystal oscillator designated in Figure 2 by the reference numeral 42. The source of pulses at the frequency $f_2$ may be any conventional frequency divider network, as for example, a multivibrator synchronized at a frequency $f_2$ by the output of the crystal oscillator 42.

The negative going pulses 54 from the pulse modulator 46 which are fed to the cathode 18 of the oscillator tube 10 also bias the diode rectifier 32 so that it is non-conducting during the regenerative periods of oscillation of tubes 10 and 12. When the diode rectifier 32 is biased to be non-conductive, oscillations are permitted to build up in the tubes 10, 12 and tank circuit 26. The repetition interval given by the frequency $f_1$ (which is the higher of the keying frequencies $f_1$ and $f_2$) is thus divided into a regenerative and a degenerative period. During the initial part of the regenerative period the oscillations at the frequency $f_3$ and of the tank circuit 26 build up exponentially. The oscillations in the tank circuit 26 decrease exponentially in the degenerative phase. The phase of the $f_3$ oscillations must essentially be periodic at the frequencies $f_1$ and $f_2$. If not, the output of this spectrum generator would be that of a carrier which is amplitude modulated at the repetition frequency $f_1$ and $f_2$.

In the correct mode of operation, that is when due to the large harmonic content of the keying voltage, the phase of the $f_3$ oscillations is controlled at the time the next regenerative period starts, the output of this spectrum generator can consist only of harmonics of the output of crystal oscillator 42 at a frequency $f_1$. Oscillations at the resonant frequency $f_3$ of the tank circuit 26 are not detectable in the output except when they are exact integral multiples of $f_2$.

In explaining the operation of the circuit illustrated in Figure 2 numerical values are utilized, for example, which are noted in that figure $f_1$=10 mc. and $f_2$=1 mc.

Figure 4:
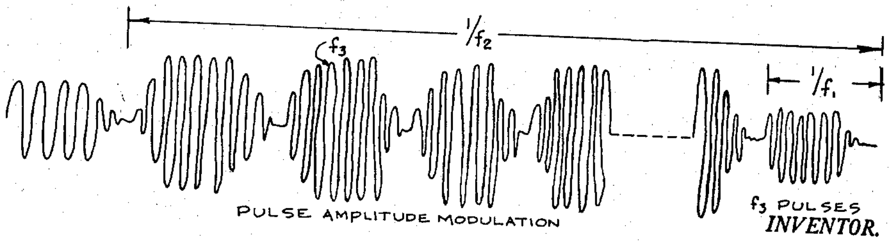
Figure 4 illustrates the output spectrum for both pulse width modulation and amplitude modulation.

To obtain the desired amplitude characteristic of the output spectrum, two different type outputs of the pulse modulator 46 may be chosen if they are applied to a correspondingly designed periodically controlled oscillator. For example, amplitude modulation of the control pulses may be equally as useful as pulse-width modulation of the control pulses. The number of pulses in a pulse group that is characterized by having a total width of $1/f_2$ sec. and pulses which are uniformly larger or wider than those of the immediately adjacent pulse groups must be equal to the number of small amplitude harmonics which it is desired to obtain between any two successive large amplitude harmonics. The output pulses for the type of modulation concerned with in Fig. 2 is shown in Figure 4.

This spectrum generator is useful in conjunction with panoramic type indicators which are scanning receivers that display the frequency and amplitude of incoming signals on an oscilloscope. The injection of the spectrum generator output, together with the signal to be investigated, would result in a display of vertical pips which are located in order of frequency and distinguishable by different heights and which would include the signal to be investigated superimposed thereon. These pips mark positions which correspond to integral multiples of the frequencies $f_1$ and $f_2$ of the spectrum generator. The spectrum generator also permits single crystal control of a multiplicity of channel frequencies.

Figure 3:
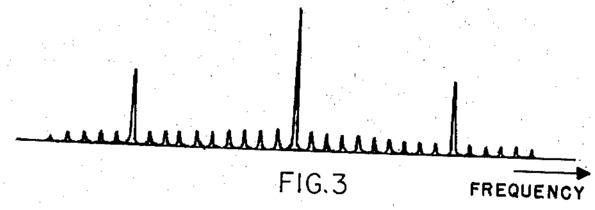
Figure 3 illustrates the output spectrum obtained from the circuit shown in Figure 2.

In applying these pulses to the periodically controlled oscillator, its output wave form will consist of a group of $f_3$ pulses each having the same envelope wave form followed by one group of $f_3$ pulses which deviate in their envelope wave form from that of the preceding group by having either a modified shape of its leading edge or a different length of the regenerative period. Each group of $f_3$ pulses with a modified envelope wave form will produce a corresponding higher peak in the frequency spectrum, with peaks of lower amplitude being formed by the groups of uniform wave shape. An illustration of the appearance of the frequency spectrum of these wave forms as it would be displayed in a panoramic oscilloscope is shown in Figure 3.

Having thus described the invention, what is claimed is:

A spectrum generator comprising a first oscillator operating at a first frequency, a second oscillator controlled by said first oscillator operating at a second frequency that is a subharmonic of the first frequency, a pulse modulator connected to said first and second oscillators and having an output having a repetition frequency equal to the frequency of said first oscillator upon which is superposed the frequency of said second oscillator, a main oscillator operating at a frequency higher than each of said first and second oscillators, and means including said pulse modulator for periodically quenching said main oscillator whereby in the frequency spectrum of the output of said main oscillator the harmonics of the first frequency will have a higher amplitude than the harmonics of said second frequency.

References Cited in the file of this patent

UNITED STATES PATENTS

| | | |
|---|---|---|
| 2,375,695 | Shapiro | May 8, 1945 |
| 2,461,456 | Usselman | Feb. 8, 1949 |
| 2,578,980 | O'Brien | Dec. 18, 1951 |
| 2,688,077 | White et al. | Aug. 31, 1954 |
| 2,730,624 | Hahnel | Jan. 10, 1956 |